United States Patent [19]

Baron

[11] Patent Number: 4,728,175

[45] Date of Patent: Mar. 1, 1988

[54] LIQUID CRYSTAL DISPLAY HAVING PIXELS WITH AUXILIARY CAPACITANCE

[75] Inventor: Yair Baron, Oakland, Mich.

[73] Assignee: Ovonic Imaging Systems, Inc., Troy, Mich.

[21] Appl. No.: 916,914

[22] Filed: Oct. 9, 1986

[51] Int. Cl.⁴ .................................................. G02F 1/13
[52] U.S. Cl. ..................................... 350/336; 350/333; 350/339 R
[58] Field of Search ...................... 350/333, 336, 339 R

[56] References Cited

U.S. PATENT DOCUMENTS

| | | | |
|---|---|---|---|
| 4,523,811 | 6/1985 | Ota | 350/336 X |
| 4,534,623 | 8/1985 | Araki | 350/339 R |
| 4,589,733 | 5/1986 | Yaniv et al. | 350/333 X |
| 4,639,087 | 1/1987 | Cannella | 350/339 R X |
| 4,676,603 | 6/1987 | Fertig | 350/336 |
| 4,697,331 | 10/1987 | Boulitrop et al. | 350/336 X |

Primary Examiner—Stanley D. Miller
Assistant Examiner—Richard F. Gallivan
Attorney, Agent, or Firm—Marvin S. Siskind; Richard M. Goldman

[57] ABSTRACT

A light influencing display including at least one pixel having a pixel capacitance and an auxiliary capacitance in parallel with the pixel capacitance is disclosed. The pixel includes electrodes located in at least three spaced apart layers, namely a first electrode including first and second spaced apart electrode portions in a first layer, and a second electrode spaced from and facing the first electrode portions in substantially parallel relations thereto in a second layer. The second electrode is electrically insulated from all external circuit connections and from all other pixel electrodes and liquid crystal display material is disposed between the first electrode and the second electrode. The auxiliary capacitance is provided by at least a first auxiliary electrode in a third layer spaced and insulated from and facing at least the first electrode portion of the first electrode on the side of the first electrode opposite the liquid crystal material. The auxiliary electrode is electrically connected to the second electrode portion of the first electrode. Additional auxiliary capacitance can be provided by including in the pixel a second auxiliary electrode in the third layer connected to the first portion of the first electrode. A method of efficiently constructing such pixels using only one layer of insulation which performs three distinct functions is also disclosed. Further additional auxiliary capacitance may also be provided by including additional auxiliary electrodes located in additional layers.

31 Claims, 20 Drawing Figures

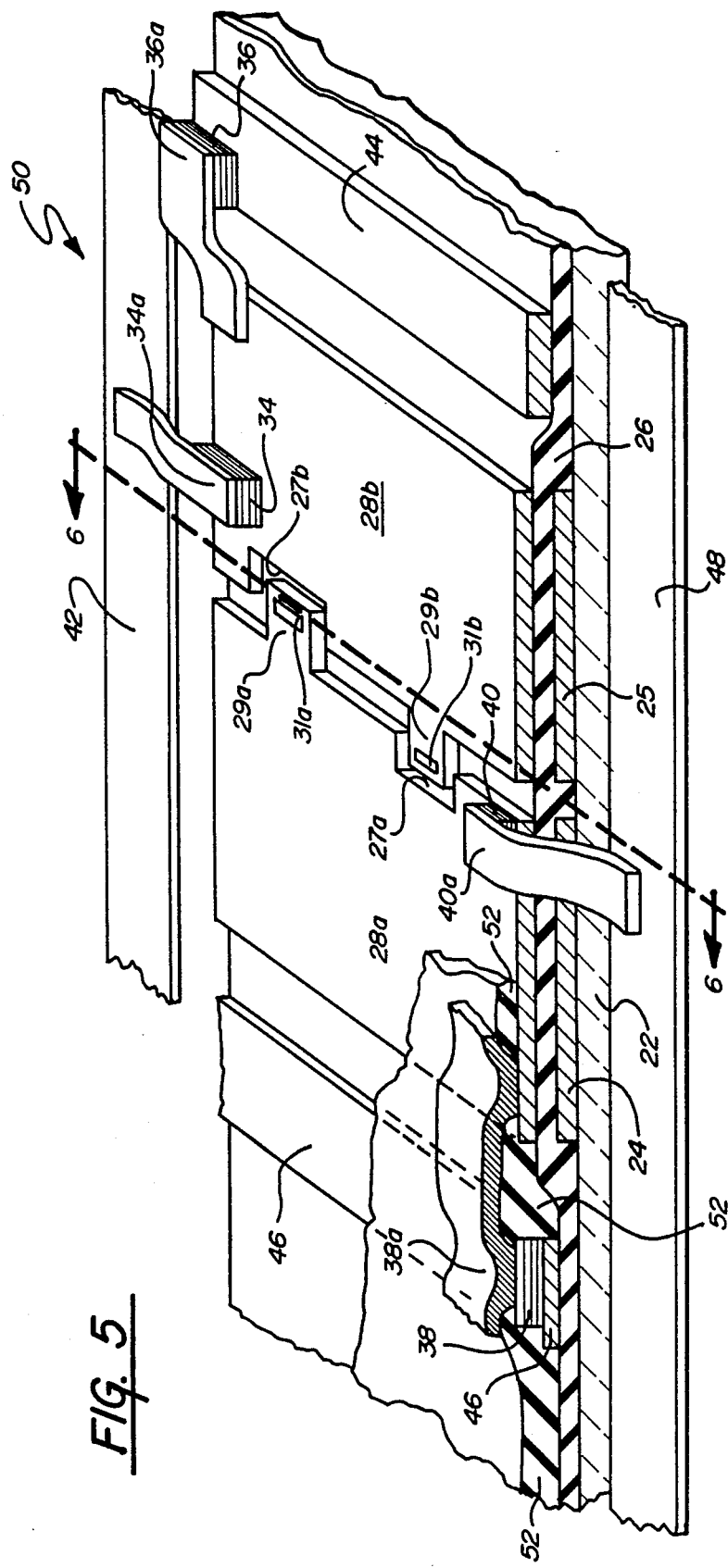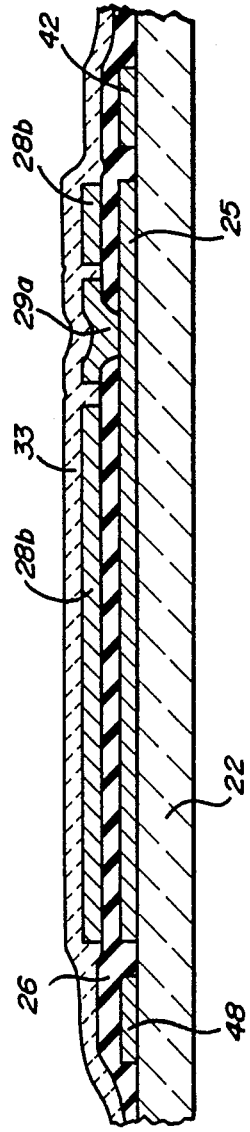
FIG. 5
FIG. 6

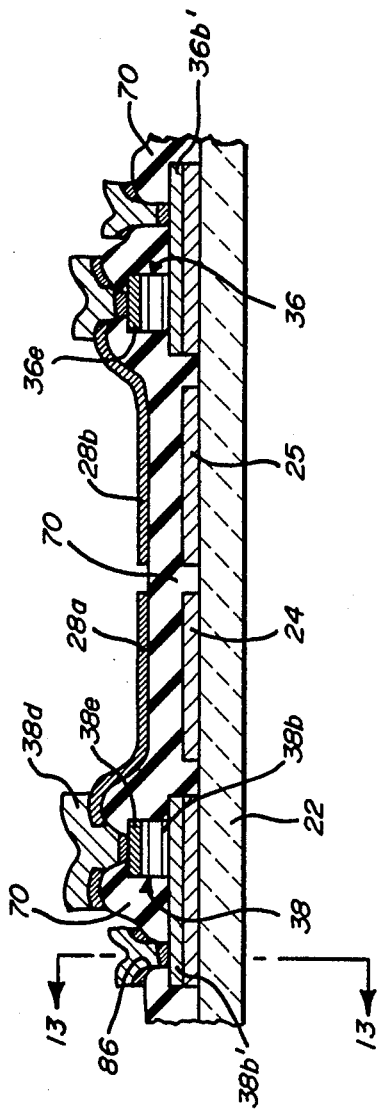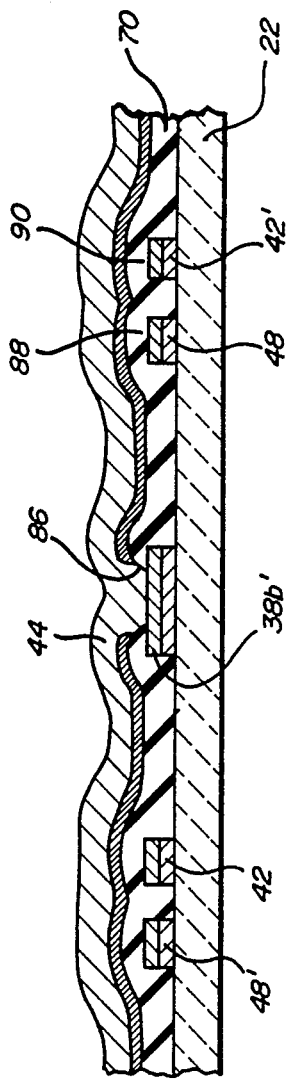

LIQUID CRYSTAL DISPLAY HAVING PIXELS WITH AUXILIARY CAPACITANCE

FIELD OF THE INVENTION

The present invention relates generally to light influencing displays and more particularly to liquid crystal displays wherein auxiliary capacitance is provided in parallel with the pixel capacitance of the display pixels.

BACKGROUND

There are many applications wherein light influencing displays are utilized to advantage. For example, light influencing displays find use in computer terminals, avionic information displays, digital watches, digital clocks, calculators, portable television receivers, and various forms of portable games.

Light influencing displays can be formed in many configurations using a number of different types of light influencing materials. By the term "light influencing material" is meant any material which emits light or can be used to selectively vary the intensity, phase, or polarization of light either being reflected from or transmitted through the material. Liquid crystal material is only one such material having these characteristics. Generally, each pixel includes a pair of electrodes which can be individually addressable and liquid crystal material between the electrodes. As is well known, when a voltage is applied across the electrodes which exceeds the voltage threshold of the liquid crystal material, the optical properties of the liquid crystal material between the electrodes can be changed to provide a light or dark display depending upon the type of material used and the desired mode of operation of the display.

Liquid crystal displays generally include a large number of pixels (picture elements) arranged in a matrix of rows and columns. Because of the large number of pixels in the matrix arrays, multiplexing is used to selectively address each pixel. To that end, each row of pixels in a common electrode plane are coupled together by row address lines and each column of pixels in the other common electrode plane are coupled together by column address lines. As a result, each pixel is located near a unique intersection of two address lines and is individually addressed by applying a voltage potential across its two intersecting lines. A passive matrix is formed when the pixel electrodes are directly coupled to the address lines. In such a matrix only the innate voltage threshold characteristic of the display material is relied upon to achieve selective actuation of only those pixels which are addressed with potentials greater than the threshold voltage. Thus, pixels can experience an increased voltage potential, because they are coupled to one of the address lines with an applied potential, but they will not be activated because the potential increase caused by the potential on one line is below the threshold voltage of the pixel. It is well known that the number of pixels which can be employed in liquid crystal displays using a passive matrix is limited by problems of pixel contrast and speed, which is dependent in part on the finite sharpness of the threshold voltage characteristics of the liquid crystal material.

To achieve high resolution, acceptable contrast and speed in displays having large numbers of pixels, displays using active matrices have been developed. Active matrix displays employ one or more isolation devices at each pixel to provide improved threshold voltage sharpness at each pixel and enhanced isolation from applied potentials between the pixels on the common address lines. A number of different types of two, three or four terminal isolation devices can be used to provide the required isolation. By the term "isolation device" is meant any device which enhances the ability for one pixel to be addressed (switched) without switching or adversely affecting other pixels sharing one or more common address lines. Such isolation devices can include threshold devices such as one or more diodes arranged in various configurations, M-I-M structures, etc., all of which provide a more precise voltage threshold than that provided by the light influencing material itself. A more precise voltage threshold means a smaller variance in the voltage required to switch the pixel from off to on. Other examples of isolation devices can include switching devices, such as thin film transistors.

Some two terminal isolation devices, such as diodes and some configurations of three terminal devices can be though of as single polarity devices, which can be turned on in only one direction or polarity. Three terminal devices, such as thin film transistors and other two terminal devices, such as diode rings, metal-insulator-metal (M-I-M) devices, and $n^+$-i-$n^+$ and $n^+$-pi-$n^+$ threshold isolation devices, can be thought of as dual polarity devices which can be turned on so as to conduct current in either one of two directions through the switch or device.

One problem in fabricating active matrix light influencing displays is yield. Virtually 100 percent of all of the isolation devices must be operational to obtain a usable display. Such extremely high yields can be difficult to achieve for large area displays, because the making of active matrix displays requires numerous process steps, and because a number such steps require extremely accurate photolithography over large dimensions, which is generally difficult to achieve.

Liquid crystal displays which can be manufactured with high yields and which utilize diodes for isolation devices are disclosed U.S. applications Ser. Nos. 573,004 abandoned, and 675,941, each entitled "Liquid Crystal Displays Operated By Amorphous Silicon Alloy Diodes", and filed in the names of Zvi Yaniv, Vincent D. Cannella, Gregory L. Hansell and Louis D. Swartz, on Jan. 23. 1984 and Dec. 3, 1984 respectively, which applications are incorporated herein by reference. As disclosed therein, the diodes can be formed with reduced precision photolithography and in fewer process steps than that required to form some of the prior isolation devices.

The displays disclosed in the aforementioned referenced pending U.S. applications and those generally known in the art most often must rely upon only on the charge retention due to the pixel capacitance resulting from the pair of electrodes and liquid crystal material to maintain a pixel in a desired optical condition. The total amount of charge which can be stored at a pixel location, relative to the overall conductance of the light influencing material (and any other leakage paths) available to discharge the stored charge, directly influences how successfully a desired voltage above some minimum threshold level can be held across the liquid crystal display material of a pixel so as to maintain the pixel in a given optical condition after the potentials are applied and during the time in which the other pixels of the display are being addressed. In other words, as total capacitance at the pixel is increased relative to the leakage paths available to discharge the pixel, the ratio between the peak voltage applied across the pixel to charge the pixel and the resultant RMS voltage across the pixel is decreased. Adding additional or auxiliary capacitance to increase the total amount of charge which may be stored is difficult because the added capacitance must be applied in parallel with the pixel capacitance across the electrodes which requires an electrical connection through the liquid crystal material. The addition of auxiliary capacitance is further complicated by the fact that the displays have addressing circuitry on both electrode planes.

An improved active matrix display having all of the addressing electronic circuitry, including isolation devices, on one substrate or pixel electrode plane of the display is disclosed in U.S. Pat. No. 4,589,733 entitled "Displays And Subassemblies Having Improved Pixel Electrodes", which issued on May 20, 1986 in the names of Zvi Yaniv, Yair Baron, Vincent D. Cannella and Gregory L. Hansell. This patent is hereby incorporated herein by reference. The displays disclosed there include a plurality of pixels, with each pixel including a first electrode including a pair of spaced apart side-by-side electrode portions on one plane and a second electrode spaced from and facing the first electrode portions on a second plane. Liquid crystal material is disposed between the first electrode portions and the second electrode. The second electrode is electrically insulated from all external circuit connections and from all other pixel electrodes. These displays exhibit decreased electronic complexity because all of the addressing lines are formed on the electrode plane of the first pixel electrode. In accordance with their preferred embodiments, the address lines are coupled to each first electrode portion by one or more isolation devices to provide a high degree of pixel isolation.

An improvement to the displays of the aforementioned U.S. Pat. No. 4,589,733 is disclosed in U.S. Pat. application Ser. No. 639,001 filed Aug. 8, 1984 U.S. Pat. No. 4,639,087, in the name of Vincent D. Cannella for "Displays And Subassemblies Having Optimized Capacitance", which application is also incorporated herein by reference. As disclosed therein, an auxiliary capacitance is provided to the pixels by the addition of a third or auxiliary capacitance electrode which is spaced from and facing the first electrode portions on the side of the first electrode opposite the liquid crystal display material. As a result of this structure, the third electrode of each pixel provides an auxiliary capacitance in parallel with the pixel capacitance. Practice has shown that the RC time constant for each pixel can be increased by up to at least a factor of five (5) by virtue of this structure.

The present invention represents a further improvement to the displays disclosed in U.S. Pat. No. 4,589,733 and in aforementioned U.S. Pat. application Ser. No. 639,001. By virtue of the present invention, even larger auxiliary capacitance can be provided in parallel with the pixel capacitance in such displays.

SUMMARY OF THE INVENTION

The invention provides a light influencing display including at least one pixel having a pixel capacitance and an auxiliary capacitance. The pixel includes a first electrode including at least two spaced apart electrode portions and a second electrode spaced from and facing the first electrode portions and substantially parallel relation thereto. The second electrode is also electrically insulated from all external circuit connections and from all other pixel electrodes. The first and second electrodes of the pixel are arranged to allow light influencing material therebetween. The pixel further includes means electrically connected to said first electrode for providing said auxiliary capacitance, which are preferably integrally formed with said pixel. Said means comprises or includes a third electrode spaced and insulated from and facing one of the first electrode portions on the side of the first electrode opposite said second electrode. The third electrode is electrically connected to another one of the first electrode portions.

Preferably, the one first electrode portion and the another one of the electrode portions are immediately adjacent each other. The active surface area of the third electrode may be substantially coextensive with substantially all of the active surface area of the one first electrode portion. The pixel can further include at least one isolation device coupled to at least one of the first electrode portions through the third electrode.

In accordance with a preferred embodiment, said means of the pixel further includes a fourth electrode spaced and insulated from and facing the another one of the first electrode portions on the side of the first electrode opposite the second electrode. This fourth electrode is electrically connected to the one first electrode portion. In addition, in accordance with this preferred embodiment, the pixel may include a pair of isolation devices coupled to each of the at least two first electrode portions with at least one isolation device of each pair of isolation devices being coupled to its respective first electrode portion through one of the third or fourth electrodes.

Another aspect of the present invention is an efficient method for constructing any of the several different pixels of the present invention using just one insulating layer between the auxiliary electrodes and first pixel electrode portions by having the insulating layer perform three distinct functions. Preferably, this method for constructing a pixel of a light influencing display having a plurality of pixels comprises the steps of: (a) forming above a substrate a first conductor for providing current to said pixel and to at least one other pixel of said display, at least a first auxiliary capacitance electrode for said pixel, and at least one isolation device associated with said pixel; (b) providing a layer of insulating material which extends over substantial portions of said conductor and substantial portions of said electrode, and which substantially protects and isolates said isolation device from unintended contact with other conductors in said display; and (c) providing on top of said layer at least a portion of a second conductor for providing current to said pixel and to at least one other pixel of said display arranged so as to cross said first conductor, and a first portion of a pixel electrode disposed at least in part above said first auxiliary electrode for forming a first auxiliary pixel capacitance therewith. The three functions performed by the layer of insulating material according to this method are insulating the first and second conductors at the location where they cross, acting as the dielectric material of the auxiliary capacitance, and substantially protecting and isolating the isolation device.

Other aspects, features and advantages of the present invention will become apparent from the subsequent description and the appended claims taken in conjunction with the accompanying Figures.

BRIEF DESCRIPTION OF THE DRAWINGS

FIG. 5 is a perspective view partly in cross-section of the display pixel of FIG. 2A;

FIG. 6 is a cross-sectional view taken along lines 6—6 of FIG. 5;

FIG. 12 is a partial cross-sectional view of an alternate embodiment of a pixel of the present invention which has column select lines located substantially entirely above an insulating layer;

FIG. 13 is a partial cross-sectional view taken along lines 13—13 of FIG. 12.

DESCRIPTION OF THE PREFERRED EMBODIMENTS

Figure 1:
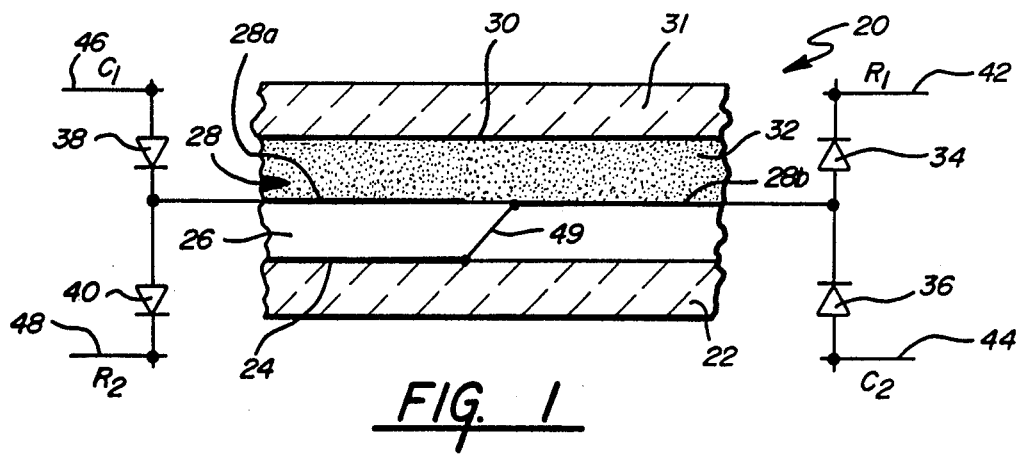
FIG. 1 is a partial cross-sectional and schematic representation of a display pixel embodying the present invention.

Referring now to FIG. 1, it illustrates a first pixel 20 of a display embodying the present invention. Although just one such pixel is illustrated in FIG. 1, any number of such pixels can be arranged in a matrix of columns and rows to provide a complete display of any desired size.

The display is formed on a substrate 22 which is preferably electrically insulating. In accordance with the preferred embodiments disclosed herein, the displays are arranged for operation either in a transmissive mode or a reflective mode. As a result, the substrate 22 is also preferably transparent to light. A suitable material for the substrate 22 is glass for example. The present invention can also be practiced in displays which are arranged to operate in only a reflective mode, which does not require the substrate 22 to be transparent.

The pixel 20 further includes an auxiliary capacitance electrode 24 which is formed on the substrate 22. The auxiliary electrode 24 is preferably formed from any suitable transparent electrically conductive material such as indium tin oxide or tin oxide. In some applications, wherein the transmissive mode of operation is not desired, the auxiliary electrode 24 can be formed from a metal such as aluminum, chromium or molybdenum. Formed over the auxiliary capacitance electrode 24 and the substrate 22 is a layer 26 of electrically insulating material. Layer 26 is preferably substantially transparent and can be formed from silicon nitride ($Si_xN_y$) or silicon oxide ($SiO_x$), for example. To avoid clutter and confusion in FIG. 1, layer 26 is not shown cross-hatched. (For the same reason, in FIGS. 2, 3 and 14–16, the various insulating layers forming part of the various auxiliary capacitances are not shown cross-hatched.)

Formed over the layer 26 is a first electrode 28 of the pixel 20. The first electrode 28 includes two spaced apart portions 28a and 28b preferably formed from a transparent conductive material such as indium tin oxide or tin oxide. A second pixel electrode 30 is spaced from and facing the first electrode in substantially parallel relation thereto. Also, and as fully described in the aforementioned U.S. Pat. No. 4,589,733, the second electrode 30 is electrically insulated from all external circuit connections and from all other pixel electrodes. As a result, and as fully described in said patent, the addressing circuitry and pixel isolation devices need be formed only on one electrode plane of the display which provides the advantages discussed above. The second electrode 30 is supported on another transparent, electrically insulating substrate 31. The electrode 30 may also be formed from any suitable transparent electrically conductive material such as indium tin oxide or tin oxide.

The electrodes 28 and 30 are arranged in spaced relation with a nominal distance such as about 2, 6 or 10 microns between them so that a layer of light influencing material 32 may be placed therebetween as shown. In accordance with the preferred embodiments herein, the light influencing material is liquid crystal material such as twisted nematic liquid crystal material. However, those in the art will appreciate that other liquid crystal materials, such as guest-host, cholesteric nematic, dynamic scattering, and chiral smectic C materials can be used in the displays of the present invention.

To facilitate the addressing and driving of the pixel 20, a pair of isolation devices 34 and 36 are coupled to portion 28b of the first electrode, and another pair of isolation devices 38 and 40 are coupled to portion 28a of the first electrode. In accordance with the preferred embodiments disclosed herein, the isolation devices are preferably diodes formed in a p-i-n configuration from thin film non-single-crystal semiconductor materials, such as amorphous silicon alloys. The manner in which such devices can be formed is fully disclosed in the aforementioned U.S. Pat. applications Ser. Nos. 573,004 and 675,941. Each of the diodes 34, 36, 38 and 40 is also coupled to an address line. Diode 34 is coupled to a row select line 42 also designated R1, diode 36 is coupled to a column or video line 44 also designated C2, diode 38 is coupled to another column or video line 46 also designated C1, and diode 40 is coupled to another row select line 48 also designated R2.

If the charge on the pixel 20 is to remain unchanged, the lines 42, 44, 46 and 48 are held at potentials which reverse bias the diodes. To charge the pixel, a short positive "video" voltage pulse is applied to line 46 simultaneously with a negative "select" voltage pulse to line 42, and the pixel charges through diodes 38 and 34.

To discharge the pixel or charge it to the other polarity, a zero or positive "video" voltage pulse respectively is applied to line 44 simultaneously with a negative "select" voltage pulse on line 48, and the pixel charges through diodes 36 and 40. In this manner, the liquid crystal material of pixel 20 may thus be alternatively charged with potentials of opposite polarities each time the pixel is addressed, thus eliminating D.C. components across the liquid crystal material which could cause degradation. The driving voltages used for the select and video voltages pulses may take the form of rectangular waves if desired.

In an active matrix display used as a computer monitor or television, for example, all of the pixels of the display are typically refreshed or rewritten (i.e., charged or discharged to the desired video voltage level) once during each frame period. For monochrome displays having a 60 Hertz refresh rate, the average frame period is 16.7 milliseconds. For certain full color displays successively presenting three primary colors 60 times per second, the frame time of certain pixels may be one-third of 16.7 milliseconds, as disclosed for example in my copending U.S. Patent application Ser. No. 834,085 filed Feb. 26, 1986 and entitled "Field Sequential Color Liquid Crystal Display And Method", which is hereby incorporated by reference. The frame period may be significantly longer than 16.7 milliseconds provided that the pixels of the display are capable of retaining a sufficiently high portion of their charge. The various embodiments of the pixels of the present invention can readily provide such capability in a number of applications.

To aid in the maintaining of the level of stored charge in the pixels between refresh times, the pixel 20 includes an auxiliary capacitance which is in parallel with the pixel capacitance of the pixel 20. As shown in FIG. 1, the auxiliary electrode 24 is spaced and insulated from and facing the first electrode portion 28a to form the auxiliary capacitance. The auxiliary capacitance is coupled in parallel with the pixel capacitance (the capacitance between electrodes 28a and 28b) by the electrical connection 49 between the electrode 24 with the other first electrode portion 28b. This represents a significant improvement in the amount of auxiliary capacitance which can be added to the pixel 20. By way of comparison, consider the disclosure of U.S. patent application Ser. No. 639,001. It shows two auxiliary capacitances in series, each having a capacity equal to the auxiliary capacitance herein, being added in parallel with the pixel capacitance by an electrode similar to electrode 24 but which extends substantially coextensively with both halves of the first electrode 28 and which is not electrically connected to any other electrode or external circuitry. It has been shown in one experimental prototype that the capacitance added by such a pixel in U.S. Pat. application Ser. No. 639,001 increases the pixel RC time constant by a significant factor, such as five (5), in comparison to a conventional pixel having two full electrodes on opposing substrates. The auxiliary capacitance added to the pixel 20 as shown in FIG. 1 herein is twice that previously obtainable with the structures disclosed in U.S. Pat. application Ser. No. 639,001. Because the added capacitance of FIG. 1 can nominally be twice as much, it increases the RC time constant of pixel 20 twice as much, such as by a factor of ten (10).

Due to the increased capacitance added in parallel to the pixels, displays utilizing the pixel structure of FIG. 1 exhibit many advantages over conventional pixel structures using two full electrodes on opposing substrates. First, these FIG. 1 pixels are much less affected by the "capacitive kick" phenomenon than are pixels of conventional design. Capacitive kick refers to the transfer of charge at the end of a refresh period of a pixel, which occurs between the pixel capacitance and the capacitance associated with the isolation device or devices such as which were turned on or forward biased into conduction, and are now being "turned off" or reverse biased on the pixel capacitance to prevent charge from escaping through them. This so-called "capacitive kick" problem adversely affects the ability of the pixel to respond as desired to the driving potentials applied during the refresh period. The amount of charge stored in the pixel capacitance which is transferred to the reverse biased isolation device inversely depends upon the ratio of pixel capacitance to isolation device capacitance and the magnitude of the reverse bias. This problem grows more severe as the just mentioned ratio is reduced, such as by reducing the overall size or area of pixels to obtain higher resolution displays. This adverse affect is significantly reduced by the addition of the auxiliary capacitance to a pixel in the manner provided by the present invention. Such additional capacitance permits the pixels to be charged with greater accuracy to any desired video voltage, thus making more levels of gray scale possible, which additional levels can be beneficially used to provide a sharper higher quality image on the display. Also, it permits higher resolution displays to be made since it significantly reduces the "capacitive kick" problem.

Second, the auxiliary capacitance provided by the present invention greatly improves the ability of the pixel to maintain the desired voltage across the pixel electrodes during any given frame period. As is well known, failure to maintain a relatively constant voltage across the pixel electrodes of the pixels of a display may, and typically does, result in a visually noticeable change in the amount of light being transmitted through, or reflected, or scattered by the light influencing material. In other words, the quality of the image presented by the display is detrimentally affected such as by reduced contrast or, in very slowly refreshed displays, by flickering. Since the auxiliary capacitance provided by the present invention greatly increases the amount of charge present in any pixel, it takes correspondingly more time to discharge the pixel through the light influencing material, as is indicated by the increased value of the RC time constant mentioned above. Stated another way, the extra capacitance greatly improves the RMS voltage to peak voltage ratio experienced by the pixel.

Third, the effects of temperature on the resistivity of the liquid crystal materials can be largely corrected. As is generally well known, the resistivity of liquid crystal material decreases with increasing temperature, and thus current leakage through liquid crystal material increases with rising temperature, which reduces the ability to maintain charge in a pixel at elevated temperatures. The end result is that higher refresh video voltages or frequencies are required at elevated temperatures to avoid display fading, flickering or other degradation of the image being shown on the display. By virtue of the added capacitance provided by the present invention, higher refresh frequencies are unnecessary and a display utilizing pixels as shown in FIG. 1 can operate at relatively low refresh frequencies such as 40 Hertz even at temperatures of 60° C. or more without any noticeable fading or flickering in the display. Other embodiments of the present invention described hereafter also have these same advantages, but to an even greater degree, since they have even more auxiliary capacitance than the FIG. 1 pixel.

Figure 2A:
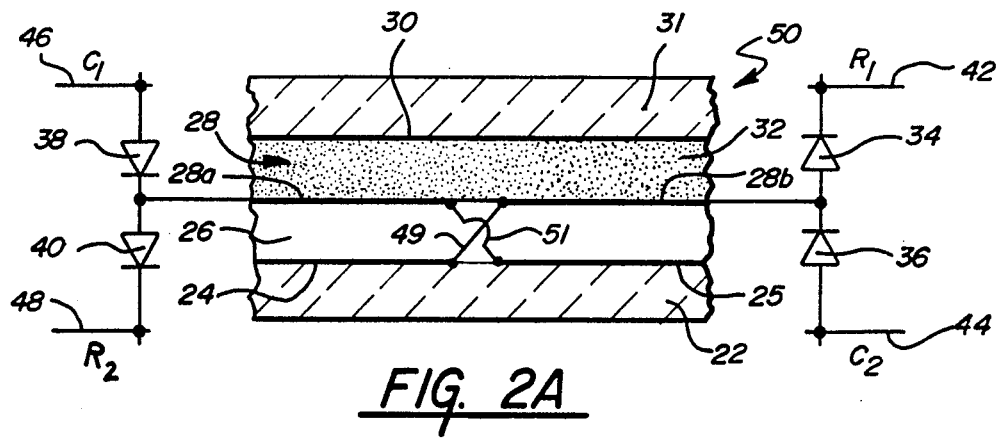
FIG. 2A through 2D are partial cross-sectional and schematic representations of second, third, fourth and fifth display pixels of the present invention.

FIG. 2A illustrates another pixel 50 of a display embodying the present invention. The pixel 50 is similar to the pixel 20 of FIG. 1 except that it includes an additional auxiliary capacitance electrode 25 to provide a combined auxiliary capacitance due to the two auxiliary electrodes which is twice the auxiliary capacitance provided in the pixel 20 of FIG. 1. In FIG. 2A and the subsequent Figures, like reference characters are utilized to identify equivalent elements illustrated in FIG. 1. Any number of such pixels 50 can be arranged in a matrix of columns and rows to provide a complete display of any desired size. The pixel 50 may be formed in the same general manner as the pixel 20 of FIG. 1, except that a pair of auxiliary capacitance electrodes namely, a first auxiliary electrode 24 and a second auxiliary electrode 25 are formed on the substrate 22. The auxiliary electrode 25 may and preferably is made in the same manner, from any of the same kinds of material as, and at the same time as first auxiliary electrode 24. The combined auxiliary capacitance of pixel 50 is formed by two auxiliary capacitances which are electrically in parallel with each other and electrically in parallel with the pixel capacitance of the pixel 50. The first auxiliary capacitance is formed by the auxiliary capacitance electrode 24 and the first electrode portion 28a and the electrical connection 49 of the auxiliary capacitance electrode 24 with the other first electrode portion 28b. Similarly, the second auxiliary capacitance is formed by the auxiliary capacitance electrode 25 and the first electrode portion 28b and the electrical connection 51 of the auxiliary capacitance electrode 25 with the first electrode portion 28a. The auxiliary capacitance electrodes 24 and 25 are respectively spaced and insulated from and facing the first electrode portions 28a and 28b.

Figure 2B:
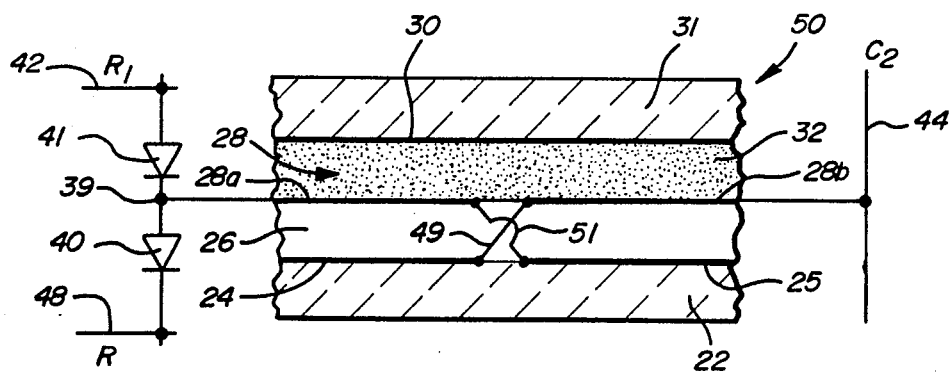

If desired, the addressing and driving of the pixel 50 of FIG. 2A may be accomplished in the same manner as is shown and described with respect to pixel 20 in FIG. 1. Alternatively, as shown in FIG. 2B, the pixel 50 may be addressed and driven by only one pair of isolation devices such as devices 40 and 41, which are respectively shown connected to row lines 48 and 42, and by one column line such as line 44 which is electrically connected directly to a suitable one of the electrode portions of pixel 50. The center node 39 between the isolation devices 40 and 41 is electrically connected to one of the first electrode portions or one of the auxiliary electrodes, and the column line 44 is electrically connected either to the other first electrode portion or to the other auxiliary electrode which is electrically insulated from the electrode portion to which the center node 39 is connected. One such connection arrangement is shown in FIG. 2B. There, the first electrode portion 28a is connected to center node 39, while the column line 44 is connected to the first electrode portion 28b. It will be readily appreciated that with node 39 connected as shown in FIG. 2B, line 44 could alternatively be connected to auxiliary electrode 24.

Figure 4A:
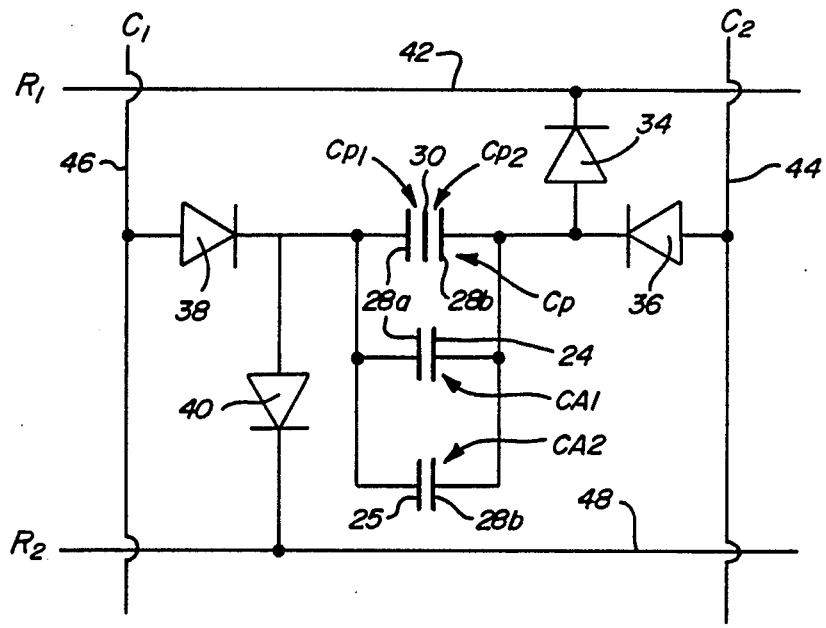
FIGS. 4A and 4B are equivalent circuit diagrams of the display pixels of FIGS. 2A and 2B, respectively.
Figure 4B:
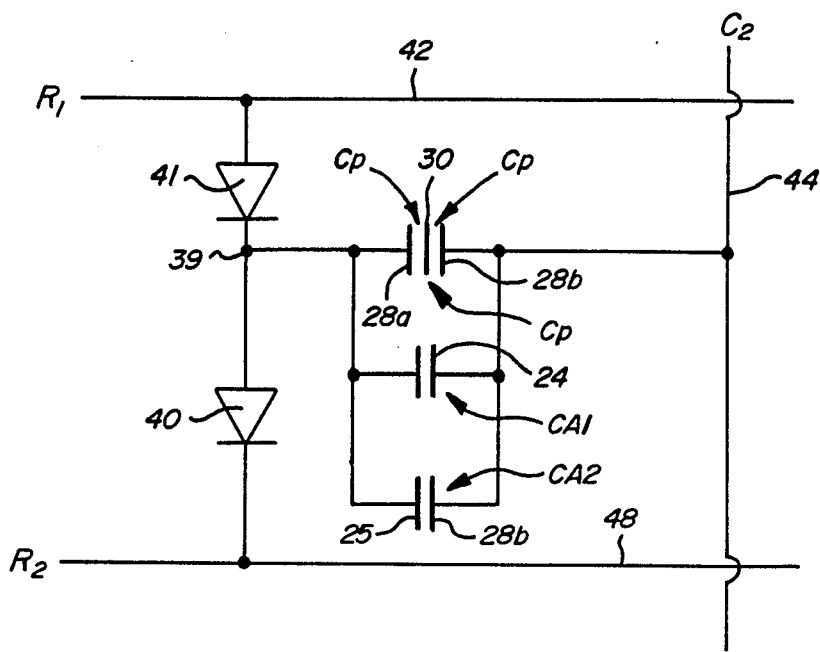

FIGS. 4A and 4B illustrate electrical equivalent circuits of the pixels 50 of FIGS. 2A and 2B respectively. As can therein be seen, the pixel capacitance $C_P$ is across the first electrode portions 28a and 28b and is formed by the series arrangement of the capacitance $C_{P1}$ between the first electrode portion 28a and the second electrode 30, and the capacitance $C_{P2}$ between the other first electrode portion 28b and the second electrode 30. The light influencing material, which may be liquid crystal display material, between the first and second electrodes forms the dielectric for the pixel capacitances $C_{P1}$ and $C_{P2}$. As shown in FIGS. 4A and 4B, the first auxiliary capacitance $C_{A1}$ is connected in parallel with the pixel capacitance $C_P$, and the second auxiliary capacitance $C_{A2}$ is also connected in parallel with the pixel capacitance $C_P$. An equivalent circuit diagram for pixel 20 of FIG. 2 can be obtained simply by removing second auxiliary capacitance $C_{A2}$ from FIG. 4A.

Figure 2C:
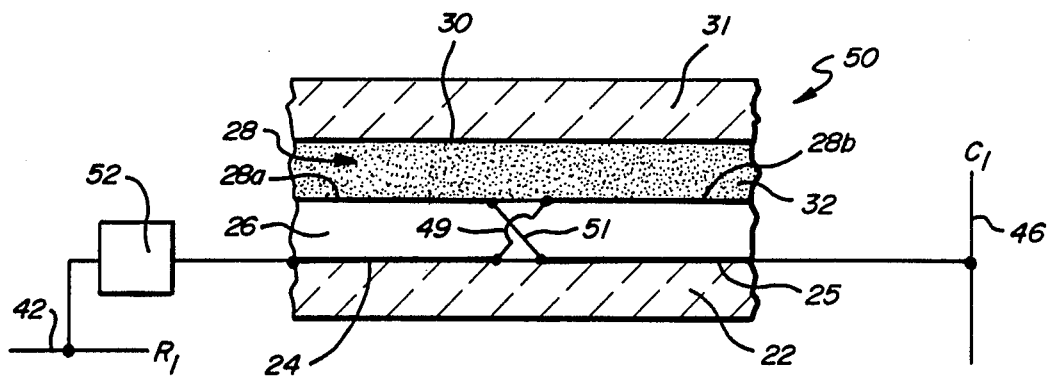

FIG. 2C illustrates in a general schematic form an alternative arrangement for connecting a two terminal isolation device 52 to pixel 50. Isolation device 52 may be electrically connected between row select line 42 and one of first electrode portions 28a or 28b or one of the auxiliary electrodes 24 or 25, while any other first electrode portion or auxiliary capacitance electrode electrically insulated from, that is not in direct positive electrical contact with, isolation device 52 is connected to column select line 46. By way of example, FIG. 2C shows isolation device 52 directly connected to auxiliary electrode 24, while column select line 46 is directly connected to auxiliary electrode 25. Isolation device 52 is preferably a bidirectional device, such as an $n^+$-i-$n^+$ or $n^+$-pi-$n^+$ threshold isolation device or the like. Preferably, such devices are made from multiple layers of thin film semiconductor material such as amorphous silicon alloys which can be reliably deposited over large areas and subsequently patterned into mesa structure devices having vertical current paths. Such vertical devices, like thin film p-i-n diodes made in multiple stacked layers, allow relatively high current to be achieved per unit area of substrate space in comparison to planar thin film devices, such as horizontally arranged thin film transistors which have very thin conduction channels and limited current-carrying capability per unit area. Accordingly, using thin film vertical devices as the isolation devices for the pixels, higher pixel densities are readily achieved since the isolation device or devices for each pixel occupies a relatively small percentage of the total space required for that pixel.

Figure 2D:
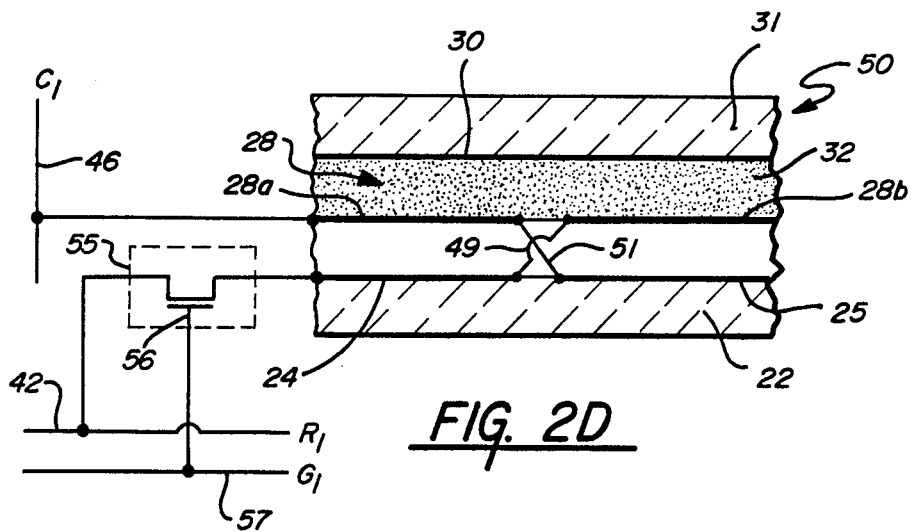

FIG. 2D illustrates yet another general arrangement for connecting a three terminal isolation device 55 to pixel 50. Isolation device 55 may be a thin film transistor. Current-carrying electrodes of device 55, e.g., the source and drain, are electrically connected between one address line, such as row select line 42, and one of the first electrode portions 28a or 28b, while another address line, such as column select line 46, is connected to another first electrode portion or auxiliary electrode of pixel 50 which is electrically insulated from the one to which isolation device 55 is connected. For example, column select line 46 may be connected to first electrode portion 28a as shown. The three terminal device may be any suitable thin film transistor, such as the conventional field effect transistor shown in FIG. 2D, which has its insulated gate 56 connected to gate line 57.

Figure 3:
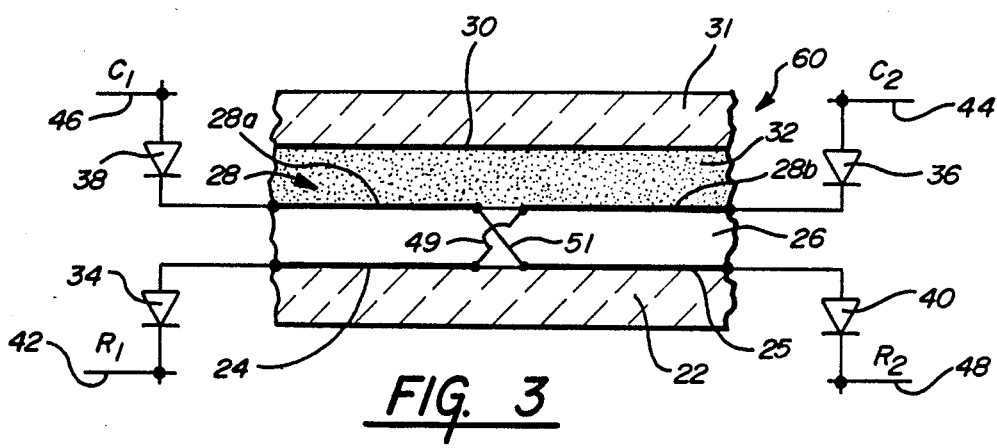
FIG. 3 is a partial cross-sectional and schematic representation of a sixth display pixel embodying the present invention.

FIG. 3 illustrates another pixel 60 of a display embodying the present invention. The pixel 60 is essentially identical to the pixel 50 of FIG. 2A and has virtually the same amount of auxiliary capacitance. The pixel 60 of FIG. 3 is connected to associated pairs of row and column lines through four diodes in a manner similar to that of FIG. 1, except that as shown in FIG. 3 the diode 34 is coupled to the first electrode portion 28b through the auxiliary electrode 24 and connection 49, while diode 40 is coupled to the first electrode portion 28a through the auxiliary electrode 25 and connection 51. An equivalent circuit for pixel 60 is illustrated in FIG. 4A.

As will become more apparent hereinafter, the structure of the pixel 60 of FIG. 3 has the advantage that the address lines 42 and 48, portions of the address lines 44 and 46, and the diodes 34, 36, 38 and 40 can be formed along with the auxiliary electrodes 24 and 25 directly above the plane of the substrate 22 from one very large area thin film multiple layer structure initially deposited as continuous layers. This approach avoids step coverage problems, and maximizes the uniformity and electronic quality of the address lines and diodes. This approach also decreases the number of processing steps in manufacturing a display employing a plurality of pixels like pixel 60 in comparison to the number of steps required for a display employing pixels like pixel 50 in FIG. 2A, for example. Also, because the address lines and diodes are formed along with the auxiliary electrodes 24 and 25 directly on the substrate plane, more uniform processing conditions are possible, which should result in improved substrate manufacturing yields.

FIGS. 5 and 6 illustrate one manner in which the pixel 50 of FIG. 2A may be manufactured. FIG. 5 illustrates all of the structure of the pixel 50 except for the liquid crystal material, the second electrode, and the top supporting substrate 31 for the second electrode 30, which have been omitted so as to avoid unduly complicating the Figure.

As can be noted from FIG. 5, the row select address lines 42 and 48 and the first and second auxiliary capacitance electrodes 24 and 25 are first formed on the substrate 22. As previously mentioned, the address lines 42 and 48 can be formed from a metal and the electrodes 24 and 25 can be formed from a transparent conductive material such as indium tin oxide. The address lines 42 and 48 and the electrodes 24 and 25 can be patterned utilizing conventional photolithographic patterning techniques well known in the art.

Over the address lines 42 and 48 and the electrodes 24 and 25 is formed the layer of insulating material 26, which can be any conventional or suitable insulating material such as silicon nitride or silicon oxide. Formed over the insulating layer 26 are the column or video address lines 44 and 46 and the first electrode portions 28a and 28b. Because of the insulating layer 26, the column address lines 44 and 46 and the row select lines 42 and 48 are electrically insulated from one another. Each of the first electrode portions 28a and 28b includes an extension 29a and 29b, respectively, which extend into the area defined by a corresponding slot 27b and 27a in the opposing electrode. Formed in the extensions 29a and 29b are openings or vias 31a and 31b which are later filled with a conductive material such as metal for electrically connecting the first electrode portion 28a with the second auxiliary electrode 25 and the first electrode portion 28b with the first auxiliary electrode 24.

The diodes 34, 36, 38 and 40 are then formed, with the diodes 36 and 38 being formed on the column address lines 44 and 46 respectively and the diodes 34 and 40 being formed on the first electrode portions 28b and 28a respectively. The diodes of this and other embodiments of the present invention are thin film non-single-crystal diodes. They can be formed by depositing continuous layers of p-type, substantially intrinsic, and n-type semiconductor alloy materials and then selectively etching the layers of semiconductor alloys to form the diodes as illustrated. A preferred method for depositing such thin film non-single-crystal semiconductor layers and processing them to form the mesa structure diodes 34, 36, 38 and 40 shown in FIGS. 5 and 6 is disclosed in copending U.S. Pat. application Ser. No. 851,756 filed Apr. 14, 1986 and entitled "Method Of Forming Thin Film Semiconductor Devices", which is hereby incorporated by reference. Preferably, a metal layer is also deposited over the semiconductor layers and patterned using conventional photolithographic techniques after which the patterned top metal which remains can be utilized as a mask during the dry etching process for etching the layers of semiconductor alloys to form the diodes. The use of a top metal contact on each diode made in the foregoing manner ensures the relatively even distribution of current over the entire horizontal cross-sectional area of each diode structure. Connecting metal lines 34a, 36a 38a and 40a may be formed to connect in any suitable fashion the diode 34 with the address line 42, the diode 36 with the electrode portion 28b, the diode 38 with the electrode portion 28a, and the diod 40 with the address line 48. The connection metal lines 34a, 36a, 38a and 40 could cause shorting of the substantially vertical side walls of the diodes if not properly insulated or otherwise spaced away therefrom. Such insulation is preferably provided by depositing a continuous layer 52 of insulating material over the partially formed structure of pixel 50 after the diodes 34, 36, 38 and 40 have been formed, and then creating openings or vias where needed in the layer to permit the subsequently deposited metal lines 34a, 36a, 38a and 40a to make direct electrical contact with the top metal layer of their respective diodes and pixel portions. To avoid unduly complicating FIG. 5, the insulating layer 52 is only shown about diode 38 and metal line 38a, and is not shown about the other diodes and connecting lines.

The spacing means used to provide the desired separation between the two glass substrates shown in the various embodiments of the present invention may take the form of dielectric spacers made of any suitable insulating material such as patterned polyimide. The spacers are of predetermined height and preferably are disposed at regular intervals above the address lines adjacent each pixel. Suitable configurations for such polyimide spacers as shown in copending U.S. Pat. application Ser. No. 853,534 filed Apr. 18, 1986 and entitled "Liquid Crystal Display Having Improved Spacers And Method Of Making Same", which is hereby incorporated by reference. Liquid crystal material can then be provided therebetween in a manner well known in the art.

Figure 7:
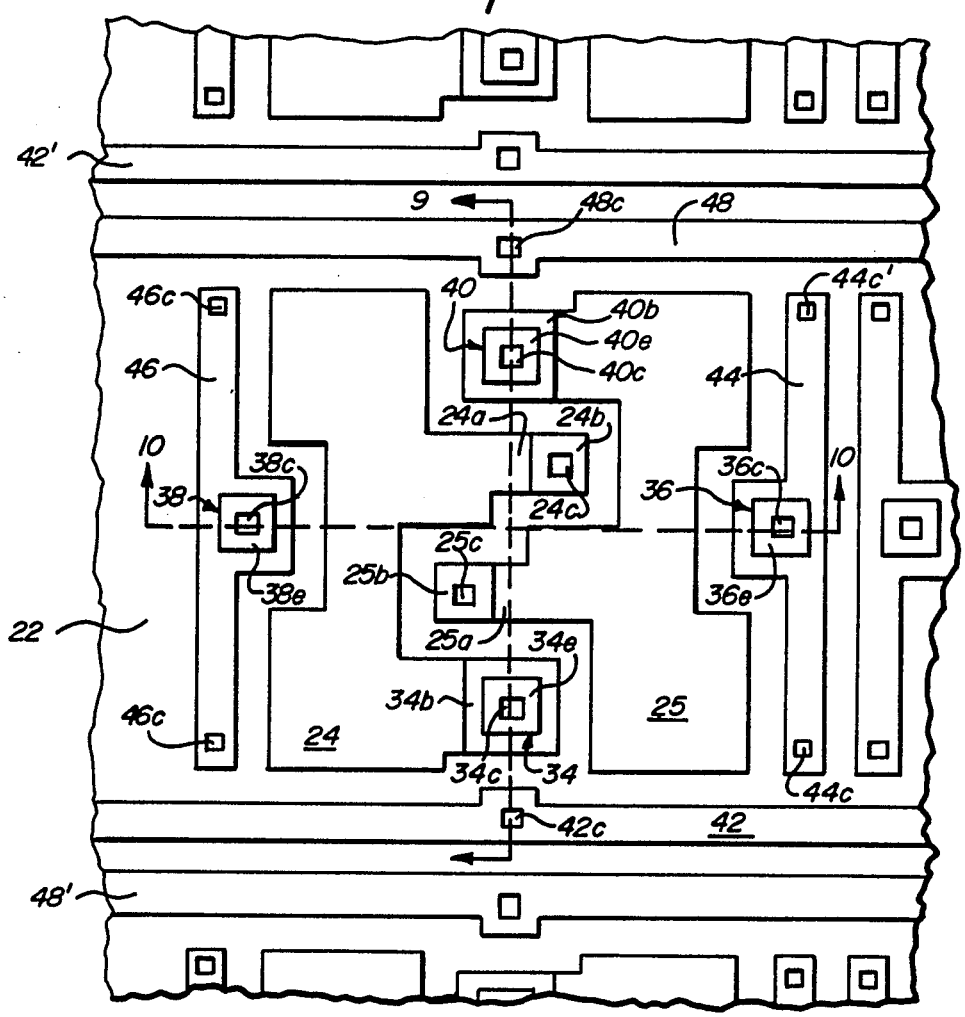
FIG. 7 is a top plan view of the display pixel of FIG. 3 during an intermediate state of its manufacture after auxiliary capacitance electrodes, partial address lines, and isolation diodes are formed on a supporting substrate.

FIGS. 7 through 11 illustrate a preferred method by which the pixel 60 of FIG. 3 can be manufactured. Reference is first made to FIG. 7 which illustrates the manner in which the auxiliary capacitance electrodes 24 and 25, the diodes 34, 36, 38 and 40, and the address lines 42, 44, 46 and 48 may be formed over the plane of the substrate 22. It may also be helpful to make reference to the cross-sectional views of FIGS. 9 and 10 during the description of FIG. 7 and the description of FIG. 8.

In fabricating the structure illustrated in FIG. 7, continuous layers of various materials are formed in sequence over the substrate 22. The first layer formed is a layer of a transparent conductor such as indium tin oxide. The second layer formed is a layer of metal such as chromium. The third, fourth and fifth layers preferably formed are a p-type semiconductor layer, an intrinsic semiconductor layer, and an n-type semiconductor layer respectively. The third through fifth layers are preferably made of suitable amorphous silicon alloy semiconductor material. The sixth layer formed is another layer of metal such as chromium. These six layers comprise a single very large area p-i-n diode structure of great uniformity which can then be subsequently patterned into the many individual high quality diodes as needed for the multitude of pixels in the display.

Figure 9:
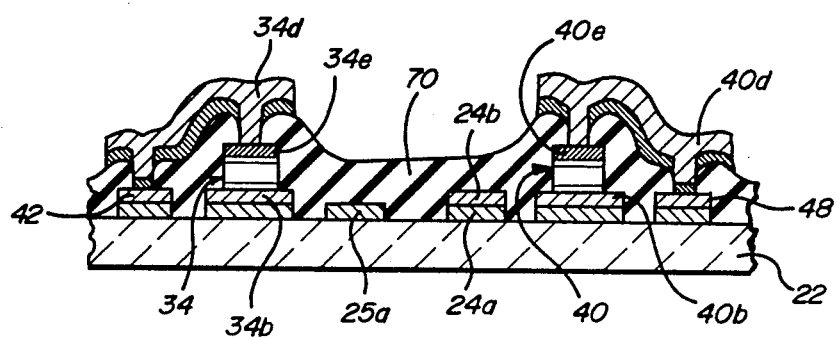
FIG. 9 is a cross-sectional view taken along lines 9—9 of FIG. 8.
Figure 10:
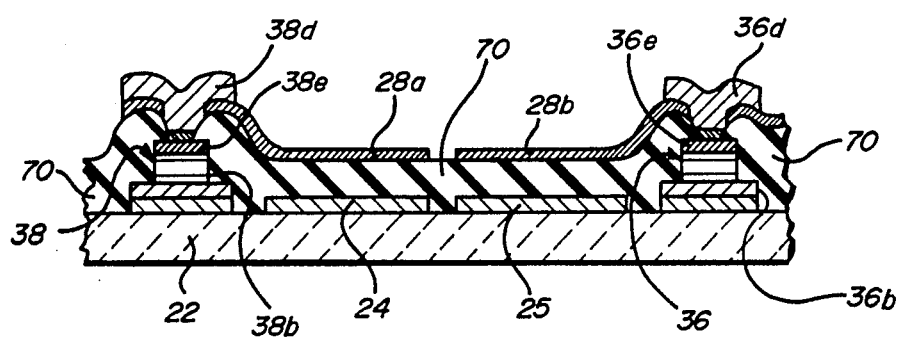
FIG. 10 is a cross-sectional view taken along lines 10—10 of FIG. 8.

The top metal layer is then patterned using conventional photolithographic techniques and etched. The metal which remains serves the dual function of a mask to define the horizontal dimensions of the diodes and as top contacts or current distributing electrodes for the diodes after the diodes are formed. Top metal contacts 34e and 40e for diodes 34 and 40 are shown in FIG. 9 and top metal contacts 36e and 38e for diodes 36 and 38 are best shown in FIG. 10. To form the diodes the amorphous semiconductor layers are preferably subjected to a dry etch for etching those portions of the semiconductor layers which are not covered by metal. The dry etch is preferably of the type disclosed in the aforementioned U.S. Pat. application Ser. No. 851,756. The semiconductor layers are etched so that the dimensions of the diodes 34, 36, 38 and 40 are defined as individual mesa structure made from the same large area p-i-n diode structure.

After the diodes are formed as described above, the second deposited layer, which was the first metal layer to be deposited, is patterned using conventional photolithographic techniques to form the top portions of row select address lines 42 and 48 and column address lines 44 and 46. As can be noted in the Figure, the column address lines 44 and 46 at this stage of the manufacture of the display are only partly formed so as to avoid making contact with the row select address lines 42 and 48. The column address lines 44 and 46 are completed during a subsequent metallization process to be described hereinafter. Note that when the first deposited metal layer is etched, bottom contacts such as contacts 34b and 40b as best seen in FIG. 9 and contacts 36b and 38b as best seen in FIG. 10 are left remaining beneath the diodes 34, 40, 36 and 38 respectively, and in a small perimeter around the diodes as well. The second deposited layer is generally removed everywhere else so that it does not interfere with the next patterning step, except where metal contact pads are desired, as will be shortly explained.

The next step in the manufacture of the display is to pattern the first deposited layer, which is a transparent conductive layer of, for example, indium tin oxide. The transparent conductive layer is patterned utilizing conventional photolithographic techniques to form the first auxiliary electrode 24 the second auxiliary electrode 25. In addition, any portions of the transparent conductor covered by the previously patterned second deposited layer will also remain.

The auxiliary electrode 24 includes an extension 24a which extends outwardly from the main portion of electrode 24 toward electrode 25. Extension 24a has an end portion which will lie beneath first electrode portion 28b that will be subsequently formed generally above electrode 25. The auxiliary electrode 25 includes a similarly arranged extension 25a with an end portion that will lie beneath first electrode portion 28a that will be subsequently formed above electrode 24.

The end portions of the extensions 24a and 25a each include a metal contact portion 24b and 25b respectively which are formed during the patterning of the first deposited metal layer, by not etching away such contact portions.

After the address lines, the auxiliary capacitance electrodes, the diodes, and the metal contacts referred to above are patterned, a layer 70 of suitable electrical insulation material, such as silicon oxide or silicon nitride, is deposited over the assembly. The insulating layer 70 is then patterned to form a plurality of vias 24c, 25c, 34c, 36c, 38c, 40c, 42c, 44c, 44c', 46c, 46c', and 48c. The vias are etched down to the metal contacts or address lines over which they are formed to permit electrical connection thereto during subsequent processing.

Figure 8:
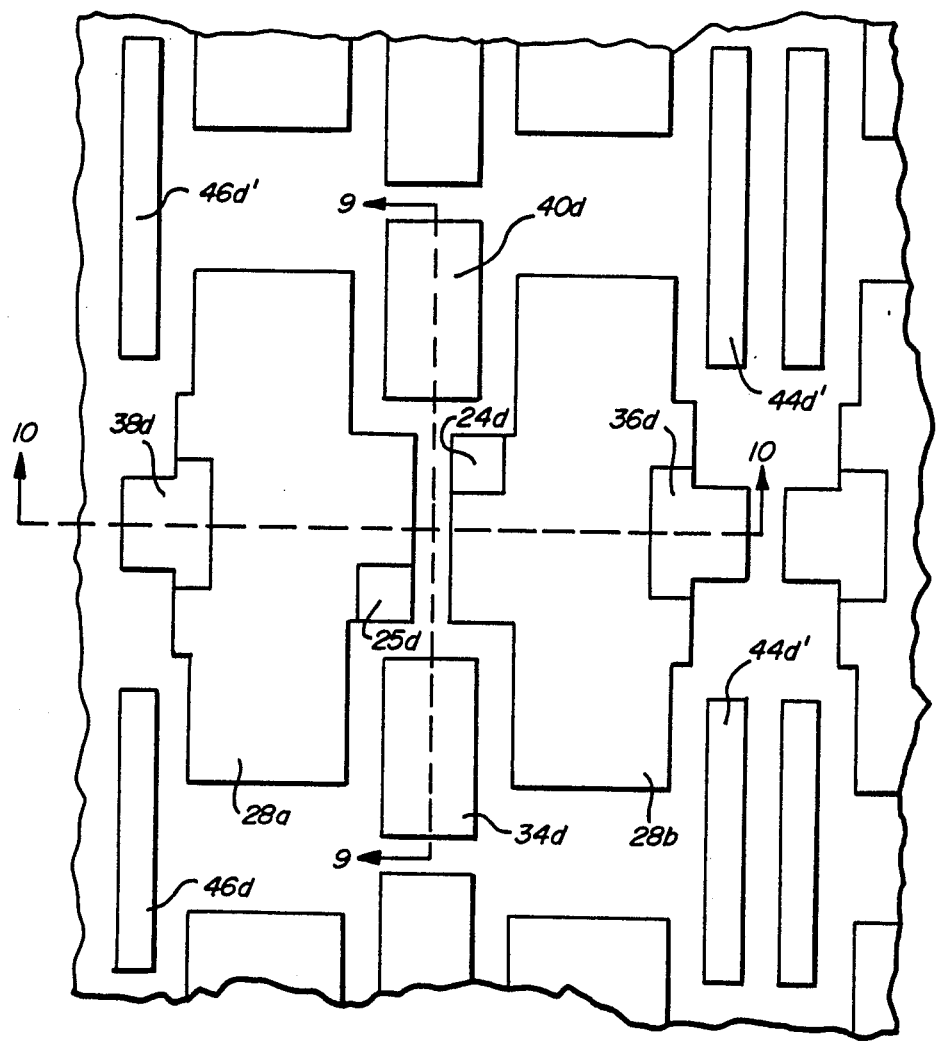
FIG. 8 is a top plan view of two additional layers of the display pixel of FIG. 3 used during a further stage of its manufacture, which two layers complete the column address lines, the first pixel electrodes and connect the isolation diodes according to the equivalent circuit diagram of FIG. 4A.

After the structure of FIG. 7 is formed, a thin continuous layer of a transparent conductor such as indium tin oxide (ITO) is deposited over the structure, and is immediately followed by the deposition of another thicker continuous layer of metal on top of the transparent conductor layer. The metal and transparent conductor layers are patterned as illustrated in FIG. 8. The metal is first patterned to form metal interconnects and thereafter, the transparent conductor is patterned. As a result of the patterning of the metal and transparent conductor layers, the metal interconnects 24d, 25d, 34d, 36d, 38d, 40d, 44d, 44d', 46d and 46d' of pixel 60 are formed and the metal layer removed from the remaining portions of the pixel 60 area. The transparent conductive first electrode portions 28a and 28b are also formed. Note that the transparent conductor underneath the metal interconnect also remains, and that the transparent conductor is removed from the remaining portions of the area for pixel 60. Typically, the transparent conductive layers used in the pixels of the present invention have a thickness on the order of 200 to 500 angstroms, with 300 angstroms being preferred for ITO. Because the transparent conductor is relatively thin compared to the thickness of the insulating layer therebeneath, it may not always provide good electrical contact through the vias to the exposed metal therebeneath due to step coverage problems. The metal interconnects, however, formed over the vias provide assured low resistance paths through the vias since the metal layer is intentionally made thick enough to avoid step coverage problems. The interconnect 24d connects the auxiliary electrode 24 with the first first electrode portion 28b. The interconnect 25d connects the auxiliary electrode 25 with the first electrode portion 28a. The interconnect 34d connects the diode 34 with the row select address line 42. The interconnect 40d connects the diode 40 with the row select address line 48 The interconnect 36d connects the diode 36 with the first electrode portion 28b. The interconnect 38d connects the diode 38 with the first electrode portion 28a. The interconnects 46d and 46d' make electrical contact with the column address line portion 46 for completing the column address line. The interconnects 44d and 44d' make contact with the address lines portion 44 for completing that column address line. After the structure illustrated in FIG. 8 is formed, the entire assembly is preferably coated with a suitable passivating layer (not shown), such as a polyimide.

Figure 11:
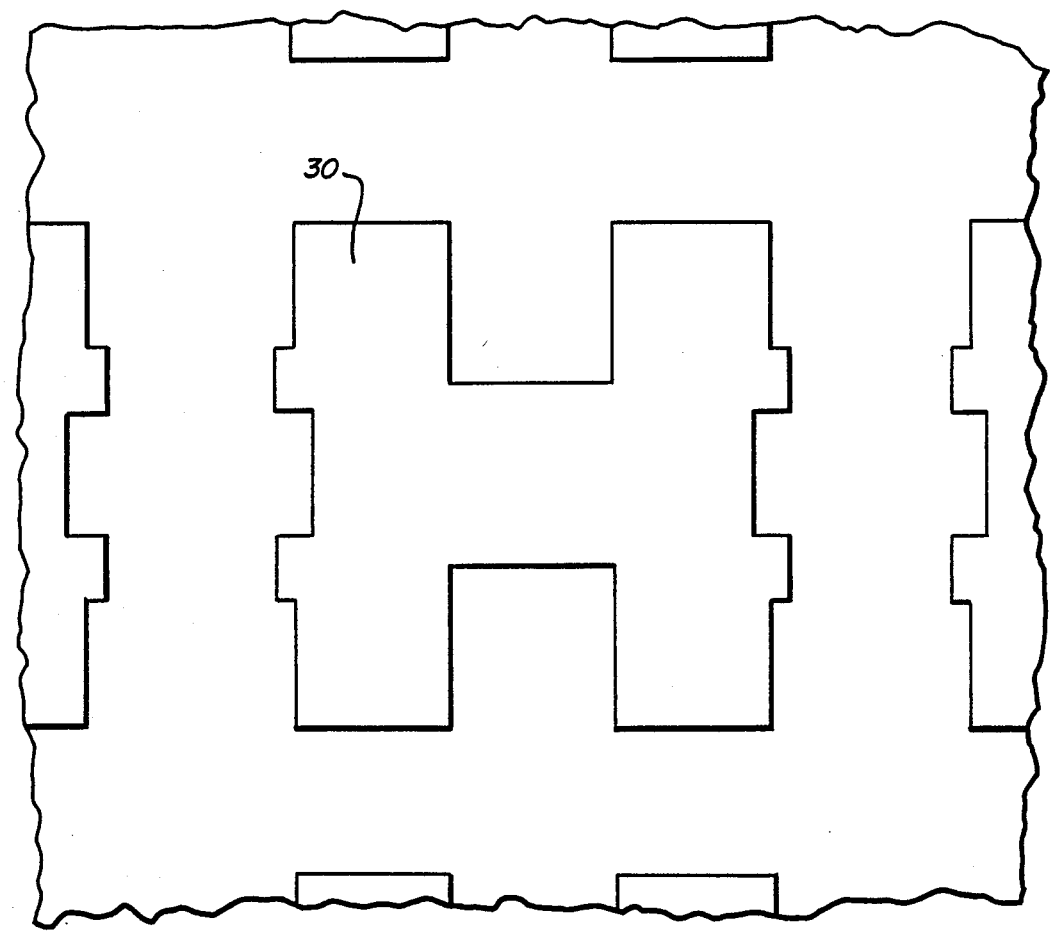
FIG. 11 is a top plan view of the top or second pixel electrode of the display pixel of FIG. 3.

FIG. 11 illustrates a preferred shape for the second electrode 30 of the pixel. As previously mentioned, the second electrode 30 is formed from a transparent conductor such as indium tin oxide and is carried by another transparent electrically insulating substrate (not shown) formed from, for example, glass. The electrode 30 is patterned so as to be substantially coextensive with the first pixel electrode portions 28a and 28b and overlies the first electrode portions 28a and 28b in substantially only those area portions wherein the first electrode portions are transparent. Other second electrodes 30 associated with other nearby pixels are shown about the periphery of FIG. 11.

To complete the display, the substrate carrying the electrode 30 is spaced from the assembly of FIG. 8 and liquid crystal material, such as a nematic liquid crystal material, is drawn in between the assembly of FIG. 8 and the substrate supporting the electrode 30. Thereafter, the side margins of the display are sealed.

The method of fabricating displays of the present invention illustrated with respect to FIGS. 7 through 11 has several advantages, including a reduced number of total processing steps and a reduced number of critical alignment or mass registration steps. One important aspect to achieving these advantages is the use of only one insulating layer, namely layer 70. Layer 70 simultaneously performs three distinct functions which are: (1) insulating address lines or conductors from one another at the point or location where they cross; (2) acting as the dielectric material for the auxiliary capacitances formed between the auxiliary electrodes and the first electrode portions; and (3) selectively isolating and physically protecting the isolation devices such as the diode mesa structures from unintended contact or electrical connection with other devices, conductors and materials, while permitting desired electrical connections to be made through vias therein.

The displays of the present invention may alternatively be constructed with either the row select lines for the column select line located substantially entirely above the insulating layer 70. For example, address lines 44 and 46 of the embodiment illustrated in FIGS. 7 through 11 may alternatively be formed substantially entirely above the insulating layer 70. One such embodiment is illustrated as pixel 80 shown in pertinent part in FIGS. 12 and 13. All of the layers, conductors, diodes and the like of pixel 80 are identical to the corresponding portions of pixel 60 illustrated in FIGS. 7 through 11, with the exception of the various differences shown in FIGS. 12 and 13, which will now be explained. As best shown in FIG. 12, the address lines 44 and 46 have been moved in an outward horizontal direction from the center of pixel 80 so that the address lines 44 and 46 are able to pass along the outer sides of diode structures 36 and 38. The diode structures 36 and 38 are formed on conductive pads 36b' and 38b' which extend outwardly and horizontally toward the address lines 44 and 46 respectively. The pads 36b' and 38b' are formed by patterning the first two deposited layers as shown. Vias 84 and 86 are opened in the insulating layer 70 to permit the address lines 44 and 46 to make electrical contact to the bottom of diodes 36 and 38 through conductive pads 36b and 38b respectively. FIG. 13 illustrates how one of the address lines, namely line 44, is formed substantially entirely above the insulating layer 70, and crosses over row select lines such as lines 48 and 42' at crossover point or locations 88 and 90. The other column address line 48 is similarly arranged on the opposite side of pixel 80.

One advantage of the design of pixel 100 over that of pixel 60 illustrated in FIGS. 7 through 11 is that the address lines on top of insulating layer 70 may be continuously formed, thus minimizing the number of electrical connections which must be successfully made to have a fully functional address line serving pixels in one column of the display.

Figure 14:
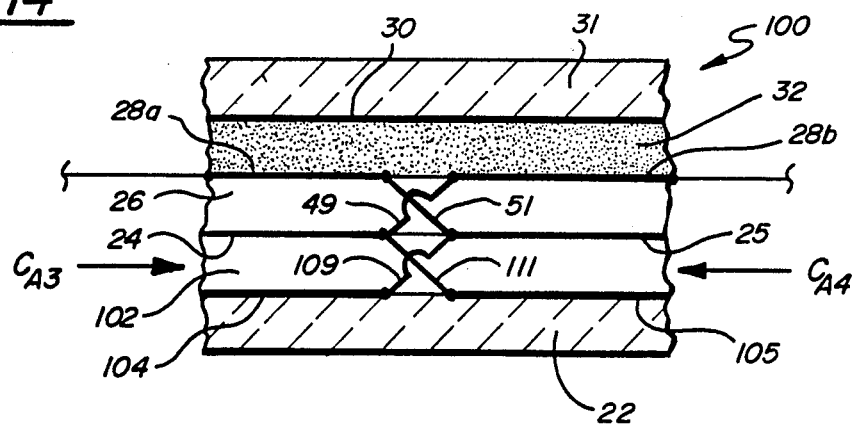
FIGS. 14 through 16 are partial cross-sectional and schematic representations of seventh, eighth and ninth display pixels of the present invention, each of which utilizes auxiliary capacitance electrodes arranged in two or more vertically spaced planes or levels which are generally horizontal to the supporting substrate.
Figure 15:
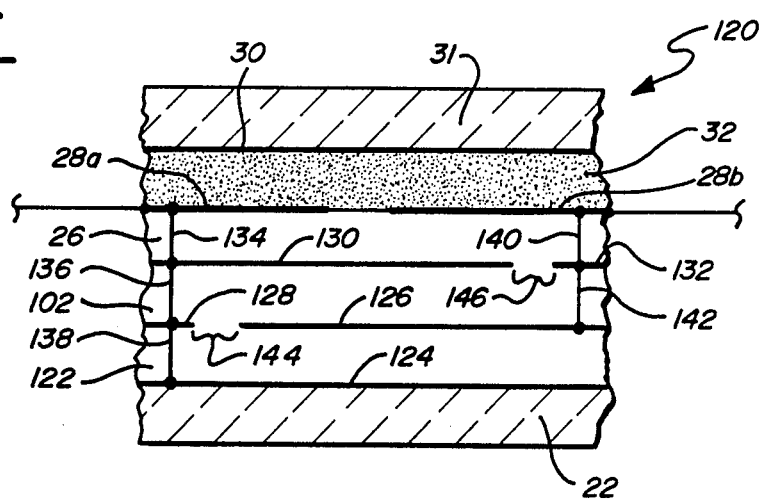
Figure 16:
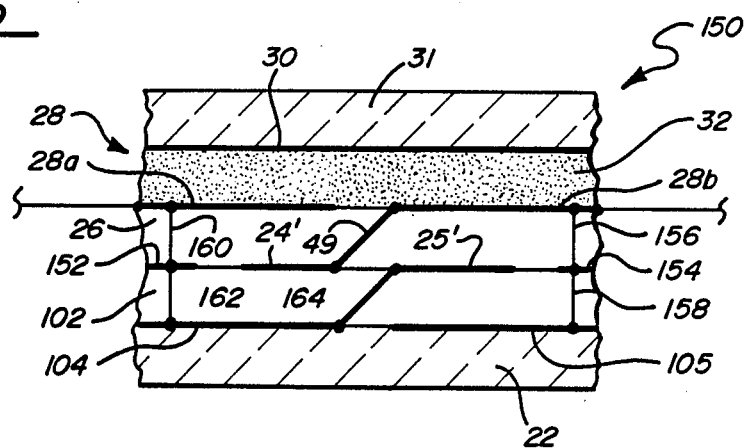

Pixels 100, 120 and 150 shown in FIGS. 14, 15 and 16 respectively are embodiments of the present invention which feature auxiliary capacitance electrodes on more than one plane or level. Pixel 100 in FIG. 14 is very similar to pixel 50 in FIG. 2A, except for the addition of layer 102 of insulating material and two additional auxiliary electrodes 104 and 105 laterally disposed adjacent to one another and between insulating layer 102 and substrate 22. Auxiliary electrode 104 is electrically connected by conductor 109 to auxiliary electrode 25, which in turn is electrically connected to first electrode portion 28a by conductor 51. Electrode 105 is electrically connected to auxiliary electrode 24 by conductor 111, which in turn is electrically connected to first electrode portion 28b by conductor 49. Thus, it can readily be appreciated that a third auxiliary capacitance $C_{A3}$ is created between electrodes 24 and 104. Similarly, a fourth auxiliary capacitance $C_{A4}$ is created between auxiliary electrodes 25 and 105. Auxiliary capacitances $C_{A3}$ and $C_{A4}$ are electrically connected in parallel with one another and with auxiliary capacitances $C_{A1}$ and $C_{A2}$. Thus, pixel 100 typically has about twice the auxiliary capacitance of pixel 50 in FIG. 2A, assuming the type and thickness of insulator layers 26 and 102 are the same and the effective areas of electrodes 24, 25, 28a, 28b, 104 and 105 are about equal.

Pixel 100 may be constructed using the same basic techniques shown in FIGS. 7 through 11 by simply providing, before the construction of any of the layers shown in FIG. 7, the auxiliary electrodes 104 and 105 arranged with respect to and connected to auxiliary electrodes 24 and 25 in the same general manner as electrodes 24 and 25 in FIG. 5A are arranged with respect to and connected to electrodes 28a and 28b. The openings through insulating layer 102 are preferably laterally displaced with respect to the openings through insulating layer 26 to avoid step coverage problems and unintended electrical contact problems between the several layers. Although not shown, those in the art will appreciate that further auxiliary capacitances could be added to pixel 100 simply by continuing to add insulating layers and auxiliary electrodes therebeneath as was done to transform pixel 50 into pixel 100.

Pixel 120 in FIG. 15 features one more layer of insulation and one more layer of auxiliary electrodes than is utilized in FIG. 14. Thus, pixel 120 includes three insulating layers above substrate 22. The added auxiliary electrode, namely auxiliary capacitance electrode 124, is located between substrate 22 and the insulating layer 122. Above insulating layer 122 is auxiliary electrode 126 and conductive pad or interconnect 128, which is electrically and physically spaced from electrode 126. Above insulating layer 102 is auxiliary electrode 130 and conductive pad or interconnect 132 which is electrically and physically spaced from electrode 130. The first electrode portion 28a is electrically connected to auxiliary electrode 130 through conductor 134. Electrode 130 is, in turn, electrically connected to conductive pad 128 beneath insulating layer 102 by conductor 136. Conductive pad 128 is electrically connected to electrode 124 beneath insulating layer 122 via conductor 138. First electrode portion 28b is electrically connected to conductive pad beneath insulating layer 26 by conductor 140, and pad 132 is electrically connected to auxiliary electrode 126 beneath insulating layer 102 by conductor 142. In practice, total area occupied by conductive pads 128 and 132, and by the spaces 144 and 146 which laterally separate the conductive pads 128 and 132 from the auxiliary electrodes 126 and 130, is preferably a small percentage, less than 20%, of the total area of auxiliary electrodes 126 and 130. For example, the conductive pads 128 and 132 and areas 144 and 146 may represent only 5% to 10% of the total area of their corresponding auxiliary electrode 126 and 130. The first electrode portion 28a and the auxiliary electrode 130 are electrically connected and therefore always at the same potential during operation, which means that these two electrodes by themselves do not provide any auxiliary capacitance. Auxiliary electrode 130 and first electrode portion 28b are not directly electrically connected and therefore may be at different potentials, and accordingly provide a first auxiliary capacitance approximately equal to that of auxiliary capacitance $C_{A1}$ in FIG. 1. Since electrode 126 may be at a different potential than electrode 130, these two electrodes form a second auxiliary capacitance approximately twice the size of the capacitance between electrodes 130 and electrode portion 28a. Auxiliary electrodes 124 and 126, will also be at different potentials during operation, and therefore form a third auxiliary capacitance, which is approximately twice the size of the first auxiliary capacitance. All three of these auxiliary capacitances are electrically in parallel with one another and the pixel capacitance. Thus assuming uniform thickness among insulating layers 26 and 102 and 122 and relatively uniform effective areas among electrodes 124, 126 and 130, each having about twice the area of either electrode portion 28a or 28b, the pixel 120 of FIG. 15 may have about 2.5 times the auxiliary capacitance of pixel 50 shown in FIG. 2A. Those in the art will appreciate that even more capacitance can be added to pixel 120 by increasing the number of insulating layers and auxiliary electrode layers by simply repeating the pattern of auxiliary electrodes and interconnections shown in FIG. 15.

Pixel 140 in FIG. 16 shows yet another possible configuration for interconnecting multiple layers of auxiliary electrodes to provide auxiliary capacitance with first electrode portions 28a and 28b. Pixel 140 is shown with just two insulating layers 26 and 102, and employs interconnection pads in a similar manner to pixel 120 in FIG. 15. Auxiliary electrodes 24' and 25' are located below first electrode portions 28a and 28b between insulating layers 26 and 102. Conductive pads 152 and 154 are located laterally to electrode portions 28' and 25'. Auxiliary electrodes 104 and 105 are located between insulating layer 102 and insulating substrate 22 as in pixel 100 of FIG. 14. Conductors 156 and 158 electrically interconnect electrode portion 28b, conductive pad 154 and auxiliary electrode 105 as shown. Similarly, conductors 160 and 162 electrically interconnect electrode portion 28a, pad 152 and Auxiliary electrode 104. Electrode 104 is electrically connected to electrode 25' through conductor 25'. In practice, the total area for conductive pads 152 and 154 and the lateral spaces separating them from Auxiliary electrodes 24' and 25' are small in comparison to the total area of electrodes 24' and 25'. Accordingly, if the thickness of insulating layers 26 and 102 is the same and the effective areas of electrodes 24', 25', 104 and 105 and of electrode portions 28a and 28b are about the same, pixel 150 will have about the same auxiliary capacitance as pixel 200 of FIG. 14. The principal difference between pixels 100 and 150 is that pixel 150 interconnects its electrodes in a more complicated fashion, as exemplified by the circuitous connection of electrode 25' to electrode portion 28a through conductive pad 152 and lower electrode 104. If desired, the electrode interconnection scheme of pixel 100 may also be added to and used in pixel 150, thereby providing redundancy for electrical interconnections among multiple levels of first electrode portions and auxiliary electrodes for maximum reliability.

Any of the isolation devices and any of the configurations or connections of such isolation devices disclosed in FIGS. 1 through 3 may be used with pixel 100, 120 and 150 shown in FIGS. 12 through 14. Similarly, any of the thin film materials and construction techniques disclosed with respect to FIGS. 1 through 12 may readily be used or adapted to construct the pixels of FIGS. 12 through 14.

The auxiliary capacitances of the pixels of the present invention can be substantially controlled by adjusting the thickness and the type of insulating layer between the electrode pairs which form the auxiliary capacitor. As is well known, the capacitance of a capacitor is inversely proportional to the thickness of the insulating layer between the electrodes or plates of the capacitor, and directly proportional to the dielectric constant of the insulating layer. In the pixels of the present invention, the insulating layer should be sufficiently thick so as to be free of pin holes or other electrical shorts. Preferably, all of the insulating layers are formed of a substantially transparent insulator such as silicon-oxide ($Si_xO_y$). The insulating layer can be formed from silicon dioxide, for example in the range of 500 to 10,000 angstroms in thickness depending upon the configuration of the pixel, and preferably is about 5,000 to 7,000 angstroms thick for the pixel embodiment illustrated in FIGS. 7 through 11. The dielectric constant of the $SiO_2$ is about 4.0. Other insulators with higher dielectric constants can be used, especially where transparency is not important. For example, the dielectric constant of SiO is about 6.0, $Al_2O_3$ is about 9.0, $Si_3N_4$ is about 7.0 to 9.0 and $Bi_2O_3$ is about 18.0. Any other suitable insulative material may also be used as the dielectric material for the auxiliary capacitances in the pixels of the present invention.

Any one of the various pixels of the present invention may be with one or more of the isolation devices or switches disclosed herein or any other conventional or suitable isolation devices to construct an active matrix light influencing display of any desired size. By way of example and not limitation, the size of such displays may range from 100 cm² to 1000 cm² or more, and the number of pixels in such displays may range from 10,000 to 500,000 or more. The thin film layers of insulators, conductors and semiconductors and the multilayer isolation device mesa structures used to construct the preferred pixels of the present invention are very well suited to form very large area thin film active matrix displays using relatively large minimum photolithographic feature sizes such as five or ten microns or more. Such large features combined with the minimization of the number of the various thin film layers required in the pixels of the present invention, makes the displays of the present invention highly advantageous for a manufacturing point of view.

As can be appreciated by those skilled in the art, the present invention can be practiced otherwise than as specifically disclosed herein. The Figures and discussion herein are merely meant to illustrate the instant invention and not be a limitation upon the practice thereof. Accordingly, it is to be understood that the protection sought and to be afforded hereby is defined by the following claims and all fair equivalents thereof.

I claim:

1. A light influencing display including at least one pixel having a pixel capacitance and an auxiliary capacitance, said pixel comprising:
   a first electrode including at least two spaced apart electrode portions;
   a second electrode spaced from and facing said first electrode portions in substantially parallel relation thereto, said second electrode also being electrically insulated from all external circuit connections and from all other pixel electrodes, said first and second electrodes being arranged to allow light influencing display material to be placed therebetween; and
   means, electrically connected to said first electrode for providing said auxiliary capacitance.

2. The display as in claim 1 wherein said means includes:
   a third electrode spaced and insulated from and facing at least one of said first electrode portions on the side of said first electrode opposite said second electrode, said third electrode also being electrically connected to another one of said first electrode portions.

3. The display as in claim 2 wherein said one first electrode portion and said another one of said electrode portions are immediately adjacent each other.

4. The display as in claim 3 wherein the surface area of said third electrode contributing to said auxiliary capacitance is substantially coextensive with substantially all of the active surface area of said one first electrode portion.

5. The display as defined in claim 2 wherein said third electrode is formed from a metal.

6. The display as defined in claim 5 wherein said metal is aluminum, chromium or molybdenum.

7. The display as defined in claim 2 wherein said third electrode is formed from a transparent conductive material.

8. The display as in claim 2 further including at least one isolation device coupled to one of said first electrode portions.

9. The display as in claim 8 wherein said one isolation device is coupled to said at least one of said first electrode portions through said third electrode.

10. The display as in claim 8 including at least one isolation device coupled to each of said first electrode portions.

11. The display as in claim 2 further including at least a pair of isolation devices coupled to at least one of said first electrode portions.

12. The display as in claim 11 wherein one of said isolation devices of said pair of isolation devices is coupled to said first electrode portion through said third electrode.

13. The display as in claim 11 including a pair of isolation devices coupled to each of said first electrode portions.

14. The display as in claim 11 wherein said isolation devices are diodes formed at least in part from thin film non-single-crystal semiconductor material.

15. The display as defined in claim 2 including said light influencing material placed between said first and second electrodes in the form of liquid crystal material.

16. The display as in claim 15 wherein said liquid crystal material is twisted nematic material.

17. The display as in claim 2 wherein said means further includes a fourth electrode spaced and insulated from and facing said another one of said first electrode portions on the side of said first electrode opposite said second electrode, said fourth electrode being electrically connected to said one first electrode portion.

18. The display as in claim 17 wherein the surface area of said fourth electrode contributing to said auxiliary capacitance is substantially coextensive with substantially all of the active surface area of said another one of said first electrode portions.

19. The display as in claim 17 further including a pair of isolation devices coupled to each of said two first electrode portions, and wherein at least one isolation device of each said pair of isolation devices is coupled to its respective first electrode portion through one of said third or fourth electrodes.

20. The display as in claim 17 wherein said means further includes a fifth electrode spaced and insulated from and facing said third electrode on the side of said third electrode opposite said one first electrode portion, said fifth electrode being electrically connected to said one first electrode portion.

21. The display as in claim 20 wherein said means further includes a sixth electrode spaced and insulated from and facing said fourth electrode on the side of said fourth electrode opposite said another first electrode portion, said sixth electrode being electrically connected to said another first electrode portion.

22. The display as in claim 17 wherein said third and fourth electrodes are substantially coplanar, and said display further includes a fifth electrode spaced and insulated from and facing said third electrode on the side of said third electrode opposite said one first electrode portion and at least one conductive pad physically separated from and substantially coplanar with said third and fourth electrodes, said fifth electrode being electrically connected to said one electrode portion through said conductive pad and also being electrically connected to said fourth electrode.

23. The display as in claim 2 wherein said means further includes a fourth electrode spaced and insulated from and facing said third electrode on the side of said third electrode opposite said first electrode, said fourth electrode being electrically connected to said one first electrode portion.

24. The display as in claim 23 wherein said third electrode is also spaced from and faces said another one of said first electrode portions.

25. The display as in claim 23 further including a fifth electrode spaced and insulated from and facing said fourth electrode on the side of said fourth electrode opposite said third electrode, said fifth electrode being electrically connected to said third electrode.

26. A method for constructing a pixel in a light influencing display having a plurality of pixels comprising the steps of:
   (a) forming above a substrate a first conductor for providing current to said pixel and to at least one other pixel of said display, at least a first auxiliary capacitance electrode for said pixel, and at least one isolation device associated with said pixel;

(b) providing a layer of insulating material which extends over substantial portions of said conductor and substantial portions of said electrode and which substantially protects and isolates said isolation device from unintended contact with other conductors in said display; and (c) providing on top of said layer at least a portion of a second conductor for providing current to said pixel and to at least one other pixel of said display arranged so as to cross said first conductor, and a first portion of a pixel electrode disposed at least in part above said first auxiliary electrode for forming a first auxiliary pixel capacitance therewith, whereby said layer of insulating material performs at least three distinct functions, namely insulating said first and second conductors from one another at the location where they cross, acting as the dielectric material of said auxiliary pixel capacitance, and substantially protecting and isolating said isolation device.

27. A method as in claim 26 wherein said conductors are address lines orthogonally arranged with respect to one another.

28. A method as in claim 27 wherein said second conductor is formed substantially entirely on top of said layer of insulating material.

29. A method as in claim 26 further comprising the steps of:

(d) providing an opening in said layer of insulating material above said isolation device; and (e) providing a conductive interconnect disposed at least in part above said layer electrically connecting the isolation device through said opening to said first portion of said pixel electrode.

30. A method as in claim 26 further comprising the steps of:

(d) providing a second auxiliary capacitance electrode in the same general plane as and horizontally separated and electrically isolated from said first auxiliary capacitance electrode; and (e) providing on top of said layer a second portion of said pixel electrode disposed in substantial part above said second auxiliary electrode for forming a second auxiliary pixel capacitance, whereby said layer of insulating material acts as the dielectric material for said second auxiliary pixel capacitance.

31. A method as in claim 30 further comprising the step of:

(f) providing first and second openings in said layer of insulating material respectively above said first and second auxiliary capacitance electrodes;

(g) electrically connecting said first auxiliary electrode through said first opening to said second portion of said pixel electrode; and (h) electrically connecting said second auxiliary electrode through said second opening to said second portion of said pixel electrode.

* * * * *